United States Patent
Eber et al.

(10) Patent No.: US 10,768,280 B2
(45) Date of Patent: Sep. 8, 2020

(54) RANGING APPARATUS AND METHOD

(71) Applicant: NXP B.V., Eindhoven (NL)

(72) Inventors: Wolfgang Eber, Styria (AT); Bernhard Spiess, Graz (AT); Filippo Casamassima, Graz (AT)

(73) Assignee: NXP B.V., Eindhoven (NL)

( * ) Notice: Subject to any disclaimer, the term of this patent is extended or adjusted under 35 U.S.C. 154(b) by 302 days.

(21) Appl. No.: 16/004,226

(22) Filed: Jun. 8, 2018

(65) Prior Publication Data

US 2019/0004155 A1 Jan. 3, 2019

(30) Foreign Application Priority Data

Jul. 3, 2017 (EP) .................................... 17179377

(51) Int. Cl.
| | |
|---|---|
| *G01S 7/4861* | (2020.01) |
| *G01S 7/4865* | (2020.01) |
| *H04L 27/10* | (2006.01) |
| *G01S 7/487* | (2006.01) |
| *G01S 11/02* | (2010.01) |
| *H04B 14/02* | (2006.01) |

(52) U.S. Cl.
CPC ............ *G01S 7/4861* (2013.01); *G01S 7/487* (2013.01); *G01S 7/4865* (2013.01); *G01S 11/02* (2013.01); *H04L 27/103* (2013.01); *H04B 14/026* (2013.01)

(58) Field of Classification Search
CPC ..... G01S 7/4865; G01S 7/487; H04L 27/103; H04B 14/026
See application file for complete search history.

(56) References Cited

U.S. PATENT DOCUMENTS

| | | | | |
|---|---|---|---|---|
| 6,570,486 | B1 * | 5/2003 | Simon ..................... | B60R 25/04 307/10.2 |
| 7,791,457 | B2 * | 9/2010 | Ghabra ................... | B60R 25/24 340/426.36 |
| 8,930,045 | B2 * | 1/2015 | Oman ................... | G01S 13/765 701/2 |
| 9,196,102 | B2 * | 11/2015 | Warschat ................ | B60R 16/02 |
| 9,646,443 | B2 * | 5/2017 | Hamada ............. | G07C 9/00309 |
| 9,967,717 | B2 * | 5/2018 | Buttolo .................. | B60K 37/06 |
| 10,328,898 | B2 * | 6/2019 | Golsch .................... | B60R 25/20 |

(Continued)

FOREIGN PATENT DOCUMENTS

| | | |
|---|---|---|
| EP | 2800068 A2 | 11/2014 |
| GB | 2510737 A | 8/2014 |

OTHER PUBLICATIONS

Mar, J. et al. "Novel UWB in-vehicle channel measurement approach based on chirp pulse sounding signal", International Symposium on Intelligent Signal Processing and Communication Systems (ISPACS), Kanazawa, pp. 150-153 (2009).

(Continued)

*Primary Examiner* — Peter M Bythrow
(74) *Attorney, Agent, or Firm* — Rajeev Madnawat

(57) ABSTRACT

The disclosure relates to a range-classifying-module for a radio receiver, the range-classifying-module configured to: receive a signal representative of a chirp from a transmitter, determine the presence of one or more pulses in the received signal; and classify the receiver as either proximal to or distal from the transmitter based on: one or more characteristics of the one or more pulses; in addition to a time-of-arrival of the one or more pulses.

15 Claims, 4 Drawing Sheets

(56) References Cited

U.S. PATENT DOCUMENTS

| | | | | |
|---|---|---|---|---|
| 2002/0109587 A1* | 8/2002 | Attring | B60R 25/2009 | 340/426.1 |
| 2005/0024181 A1* | 2/2005 | Hofbeck | B60R 25/02 | 340/5.7 |
| 2005/0258936 A1* | 11/2005 | Ghabra | B60R 25/245 | 340/5.72 |
| 2006/0083406 A1* | 4/2006 | Ishimura | G01S 13/84 | 382/106 |
| 2006/0290503 A1* | 12/2006 | Sumida | B60R 25/245 | 340/572.1 |
| 2009/0289759 A1* | 11/2009 | Tsuchiya | G07C 9/00309 | 340/5.72 |
| 2010/0075656 A1* | 3/2010 | Howarter | B60R 25/2009 | 455/420 |
| 2010/0076622 A1* | 3/2010 | Dickerhoof | B60R 25/24 | 701/2 |
| 2010/0207754 A1* | 8/2010 | Shostak | B60C 23/0494 | 340/450 |
| 2010/0265035 A1* | 10/2010 | Ziller | G07C 9/00309 | 340/5.72 |
| 2010/0271171 A1* | 10/2010 | Sampei | B60R 25/00 | 340/5.6 |
| 2011/0057817 A1* | 3/2011 | Proefke | H01Q 1/3241 | 340/989 |
| 2011/0224870 A1* | 9/2011 | Tan | H04M 1/6091 | 701/36 |
| 2012/0092129 A1* | 4/2012 | Lickfelt | B60R 25/24 | 340/5.72 |
| 2012/0129545 A1* | 5/2012 | Hodis | G01S 19/48 | 455/456.1 |
| 2012/0158244 A1* | 6/2012 | Talty | B60R 25/24 | 701/36 |
| 2012/0268242 A1* | 10/2012 | Tieman | B60R 25/24 | 340/5.61 |
| 2013/0143594 A1* | 6/2013 | Ghabra | H04L 63/1416 | 455/456.1 |
| 2013/0157574 A1* | 6/2013 | Craine | H04W 4/80 | 455/41.2 |
| 2013/0342379 A1* | 12/2013 | Bauman | G01S 13/0209 | 342/21 |
| 2014/0240091 A1* | 8/2014 | Talty | E05B 19/0082 | 340/5.62 |
| 2014/0330449 A1* | 11/2014 | Oman | B60R 25/01 | 701/2 |
| 2015/0022332 A1* | 1/2015 | Lin | B60R 25/00 | 340/426.1 |
| 2015/0091706 A1* | 4/2015 | Chemishkian | H02J 50/20 | 340/10.34 |
| 2015/0208207 A1* | 7/2015 | Ye | H04W 4/021 | 455/456.1 |

OTHER PUBLICATIONS

Chandra, A. et al. "Frequency-Domain In-Vehicle UWB Channel Modeling", IEEE Transactions on Vehicular Technology, vol. 65, No. 6, pp. 3929-3940 (Jun. 2016).

Vychodil, J. et al. Measurement of In-Vehicle Channel—Feasibility of Ranging in UWB and MMW Band, International Conference on Connected Vehicles and Expo (ICCVE), pp. 695-698 (2014).

Kim, S. et al. "Pulse Propagation Characteristics at 2.4 GHz Inside Buildings", IEEE Transactions on Vehicular Technology, vol. 45 No. 3, pp. 570-592 (Aug. 1996).

Karapistoli, E. et al. "An Overview of the IEEE 802.15.4a Standard", IEEE Communications Magazine, pp. 47-53 (Jan. 2010).

Zouarl, R. et al. Relevant CIR parameters selection for fingerprinting based Location Algorithm, 23rd International Conference on Software, Telecommunications and Computer Networks (SoftCOM), pp. 170-173 (2015).

\* cited by examiner

RANGING APPARATUS AND METHOD

CROSS-REFERENCE TO RELATED APPLICATIONS

This application claims the priority under 35 U.S.C. § 119 of European Patent application no. 17179377.1, filed on Jul. 3, 2017, the contents of which are incorporated by reference herein.

The present disclosure relates to a ranging apparatus and associated method. In particular, although not exclusively, the disclosure relates to a vehicle with a range-determining-module for controlling access to the vehicle.

Wideband Radio Frequency (RF) applications have been developed that are capable of accurate distance measurement between two or more wireless devices. These measurements are based on Time-of-Flight (ToF) calculations which are derived by accurate determination of departure and arrival times of RF packets between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

In vehicle access control systems, an objective is to determine whether a key, or token, is inside or outside of the vehicle. Access to the vehicle or its systems is then typically controlled in accordance with this determination. In some jurisdictions, regulative requirements (TREAD act) demand an accuracy of 10 cm for PKE systems. A drawback in using ToF calculations for such applications is that the in-vehicle environment creates a lot of reflections and may also lose completely the line-of-sight connection (for example, where a key is in the driver's back pocket) so that the distance measurement generated using ToF may give a result that is inaccurate to within 1 m.

According to an aspect of the present disclosure there is provided a range-classifying-module for a radio receiver, the range-classifying-module configured to:
  receive a signal representative of a chirp from a transmitter;
  determine the presence of one or more pulses in the received signal; and
  classify the receiver as either proximal to or distal from the transmitter based on:
    one or more characteristics of the one or more pulses; in addition to a time-of-arrival of the one or more pulses.

In one or more embodiments, the one or more characteristics of the one or more pulses may be dependent on a channel characteristic of a channel between the transmitter and the receiver. The one or more characteristics of the one or more pulses may be independent of a time-of-arrival of the one or more pulses.

In one or more embodiments, the receiver may be classified as either proximal to or distal from the transmitter based on the one or more characteristics being indicative of the transmitter being either inside or outside of a vehicle.

In one or more embodiments, the one or more characteristics may comprise a separation between pulses in at least a portion of the signal. The proximity of the receiver and the transmitter may be categorized based on a comparison between a threshold pulse spacing and the measured pulse spacing. The threshold pulse spacing may correspond to a distance greater than 150 mm, 300 mm or 450 mm. The threshold pulse spacing may correspond to a distance less than 500 mm, 600 mm or 1 m.

In one or more embodiments, the one or more characteristics may comprise an energy, intensity or amplitude of at least a portion of the signal in an interval. The threshold level may be based on a measured or calculated level for a transmitter adjacent to the outside of vehicle, such as on an outer surface of the vehicle. The threshold level may be 80% of the measured or calculated level. The interval may be greater than 1, 2 or 5 nanoseconds. The interval may be less than 7 or 10 nanoseconds. The range-classifying-module may be configured to classify the receiver as proximal the transmitter if the energy, intensity or amplitude of at least a portion of the signal in an interval is less than the threshold.

In one or more embodiments, the one or more characteristics comprise the number of pulses in at least a portion of the signal. The proximity of the receiver and the transmitter may be categorized based on a comparison between a threshold number of pulses and the measured number of pulses in an interval. The interval may be greater than 5 or 10 nanoseconds. The interval may be less than 15 or 20 nanoseconds. The threshold number of pulses may be 1, 2, 3, 4 or 5 pulses. The measured number of pulses may have a magnitude greater than (or equal to) a magnitude threshold. The magnitude threshold may be set in accordance with a noise level of the signal.

In one or more embodiments, the one or more characteristics may comprise one or more non-time-of-flight characteristics of the one or more pulses. The one or more characteristics may comprise a single characteristic. The one or more characteristics may comprise a single characteristic of a plurality of pulses. The one or more characteristics may comprise a plurality of different characteristics.

In one or more embodiments, a separate decision may be made for each of the one or more characteristics and the time-of-arrival measurement. The classification may be made based on the separate decisions.

In one or more embodiments, the time-of-arrival may be based on a time-of-arrival of the first-received significant pulse of the one or more pulses.

In one or more embodiments, the chirp may be an ultra-wide band, UWB, pulse. UWB may have a bandwidth of 3-11 GHz, 4-8 GHz or 4-6.5 GHz.

According to a further aspect there is provided a vehicle passive keyless entry system comprising a radio receiver having any range-classifying-module disclosed herein. Access to the vehicle may be controlled by the passive keyless entry system in response to the classification of the distance between the receiver and the transmitter generated by the range-classifying-module. The vehicle passive keyless entry system may comprise only a single radio receiver for receive the signal representative of a chirp.

According to a further aspect there is provided a method for range classification comprising:
  receiving, at a receiver, a signal representative of a chirp from a transmitter;
  determining the presence of one or more pulses in the received signal; and
  classifying the receiver as either proximal to or distal from the transmitter based on:
    one or more characteristics of the one or more pulses; in addition to a time-of-arrival of the one or more pulses.

According to a further aspect there is provided a computer program configured to perform any method disclosed herein.

Also disclosed is a range-classifying-module for a radio receiver, the range-classifying-module configured to:

receive a signal representative of a chirp from a transmitter;

determine the presence of one or more pulses in the received signal; and classify the receiver as either proximal to or distal from the transmitter based on a characteristic of the one or more pulses. The characteristic may be a non-time of flight characteristic. The characteristic may be unrelated to a time-of-flight determination.

Except for in the case of a fundamental incompatibility, any feature disclosed in relation to one range-classifying-module may be implemented in another disclosed range-classifying-module.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Ultra-Wide Band (UWB) systems may be used to combine low-to-medium rate communications with positioning capabilities, thereby allowing centimetre level accuracy in ranging, as well as low-power and low-cost implementation of communication systems. UWB may be used for indoor localization, where GPS data is not available. One method of operating a UWB system to perform ranging involves making time-of-flight (ToF) measurements. UWB systems may operate in a frequency band of 3-11 GHz, 4-8 GHz or 4-6.5 GHz, for example.

Figure 1:
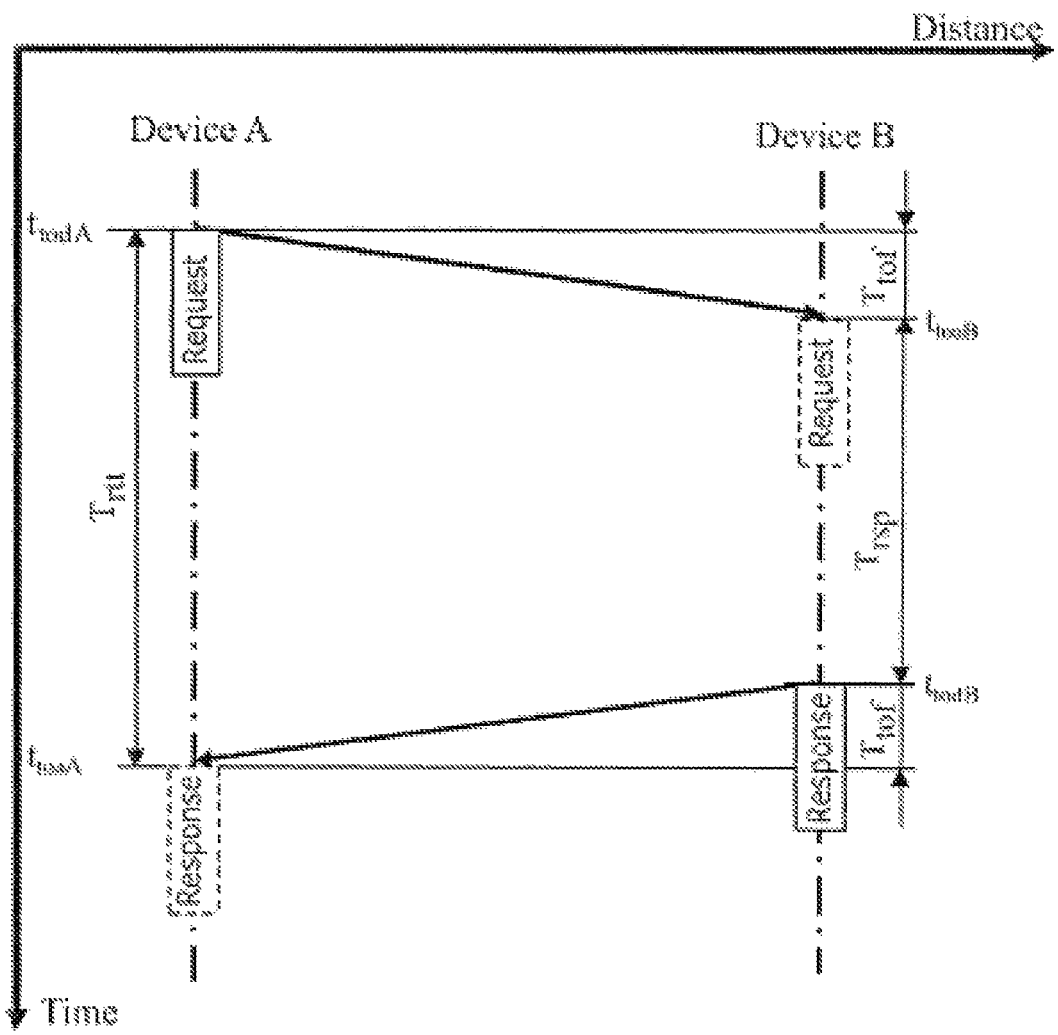
FIG. 1 shows a timing diagram for calculating a time-of-flight (ToF) between two devices.

FIG. 1 illustrates the principle of calculating the ToF between two devices, A and B, using Time-of-Arrival (ToF) and Time-of-Departure (ToD) measurements for RF packets transmitted there between. The procedure starts with Device A transmitting a 'Request' packet to Device B with a measured ToD ($t_{todA}$). Upon receipt of the Request packet, Device B measures the ToA ($t_{toaB}$) and transmits a 'Response' packet back to Device A with a measured (or predetermined) ToD ($t_{todB}$). Upon receipt of the Response packet, Device A measures the ToA of the Response packet ($t_{toaA}$). From the measured (or otherwise derived) ToDs and ToAs, a roundtrip duration ($T_{rtt}=t_{todA}-t_{toaA}$) and a response duration ($T_{rsp}=t_{toaB}-t_{todB}$) can be calculated. The ToF between the devices A and B may then be estimated from the roundtrip duration and response duration: $ToF=0.5*(T_{rtt}-T_{rsp})$.

In a multipath environment, the ToAs for the most direct (shortest) path, i.e. the 'Line-of-Sight' (LoS) path, between the two devices should be measured and used for accurately calculating the distance between two devices. Accordingly, the first arriving path for the respective RF packet needs to be found. In order to enable a receiving device to identify the first arriving path for an RF packet, the receiving device derives a channel estimate to describe the multipath environment.

Figure 2:
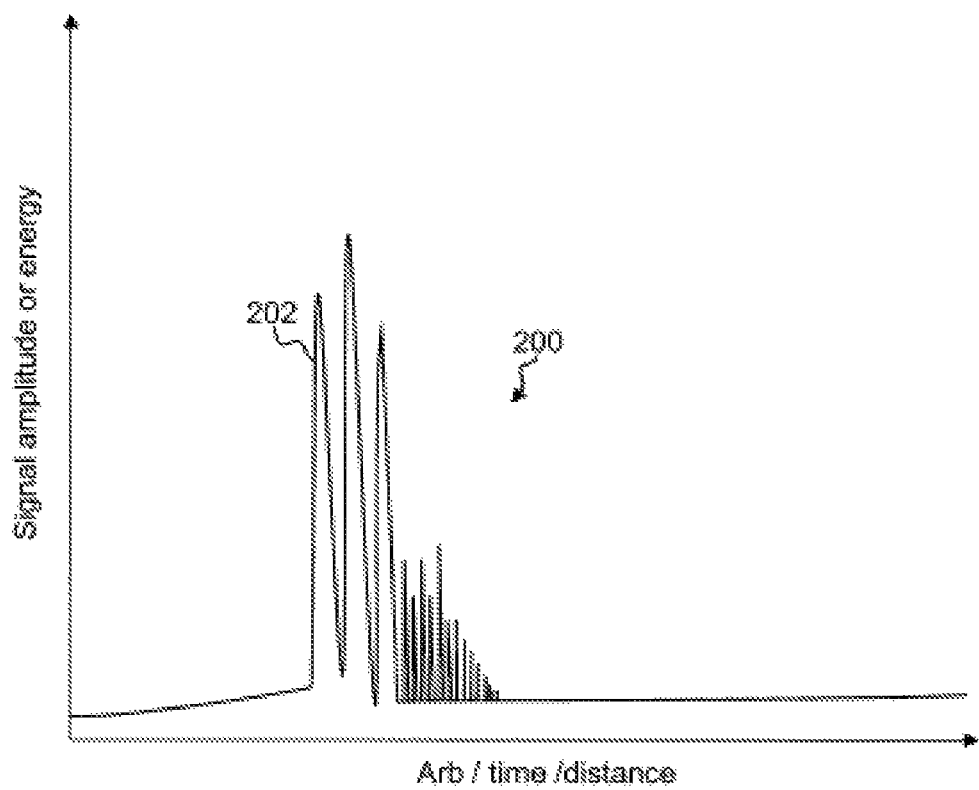
FIG. 2 illustrates an example profile similar to a channel impulse response.

FIG. 2 illustrates a simplified example of a channel estimate (not actual data).

The channel estimate 200 has a first non-zero tap 202, typically representing the first path within the multipath environment between the two devices. The LoS path signal may not be the strongest signal received by the receiver, for example when a blocking object is located directly between the transmitting device and the receiving device. As such, the tap within the channel estimate representing the LoS path may not have the highest amplitude within the channel estimate. Accordingly, the LoS path within a multipath environment may be found by identifying the first non-zero tap within the channel estimate.

In an in-vehicle environment, where the presence of many different materials and surfaces can cause multiple reflections, difficulties can be encountered using ToF measurements. The line-of-sight connection may be lost, for example, where a key is in the driver's back pocket, so that the distance measurement generated using ToF may give a result that is inaccurate to within 1 m. As such, in an environment where multiple reflections dominate, one or more anchors (receivers installed in the vehicle) may determine that the distance from a transmitter in a token is twice as large, or even larger, than the real distance. This effect may be especially pronounced if a human body is present in the measurement area, due to the human body attenuation. In such cases, pure ToF determinations, even with multiple receivers where a final result is determined in accordance with the plurality of determined distances, may lead to an incorrect determination of distance to the extent that it cannot be determined within the required accuracy whether the token is inside or outside of the vehicle.

One mechanism for addressing the inaccuracy of the ToF measurements is to increase the number of receivers within the vehicle. For example, a system with four or more separate anchors for receiving the transmitted signal may provide adequate spatial resolution, at a cost of increased system complexity.

In the embodiments described below regarding FIGS. 3 to 6, characteristics of the communication link between the transmitter and the receiver are used to determine whether a transmitter is proximal to, or distal from, the receiver. These characteristics may include one or more non-time-of flight characteristic of a signal that is received at the receiver from the transmitter in order to confirm the validity of a time of flight measurement.

The determination of whether the transmitter is proximal to, or distal from, the receiver may be used in the context of a vehicle passive keyless entry (PKE) system to determine whether a key or token is inside or outside of the vehicle. An antenna of the receiver may be provided within or on the vehicle. The receiver may be considered to be proximal to the transmitter when the antenna of the transmitter is within the vehicle and distal from the transmitter when the antenna of the transmitter is outside of the vehicle. As such, the proximity of the transmitter or receiver may be considered to depend upon whether the transmitter is within a vehicle, rather than a strict determination of distance alone.

Access to the vehicle may then be controlled by the PKE system in response to the classification of the distance between the receiver and the transmitter. For example, the PKE system may enable or disable one or more systems of the vehicle depending on whether the key is within the vehicle.

Figure 3:
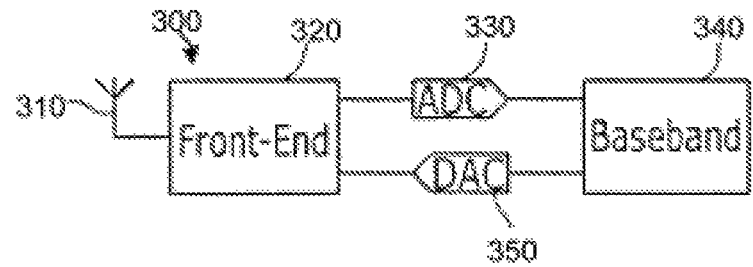
FIG. 3 illustrates a simplified block diagram of an example of part of a wireless radio frequency (RF) device.

FIG. 3 illustrates a simplified block diagram of an example of part of a wireless radio frequency (RF) receiver 300. The receiver 300 includes an antenna 310 for receiving and transmitting RF signals over an air interface. The antenna 310 is coupled to front-end circuitry 320. The front-end circuit 320 typically consists of a receive path including, for example, a low noise amplifier, mixer and band-pass filter, and a transmit path including, for example, a mixer, filter and power amplifier. The receive path of the front-end circuit 320 is coupled to a baseband range-determining-module 340 of the receiver 300 via an analogue-to-digital converter (ADC) 330, via which received signals are passed from the front-end circuit 320 to the baseband range-determining-module 340. The transmit path of the front-end circuit 320 is coupled to the baseband range-determining-module 340 via a digital-to-analogue converter (DAC) 350, via which signals to be transmitted are passed from the baseband range-determining-module 340 to the front-end circuit 320.

The baseband range-determining-module 340 of the communication device 300 is arranged to perform Time-of-Arrival (ToA) measurements on data packets within received RF signals.

Figure 4:
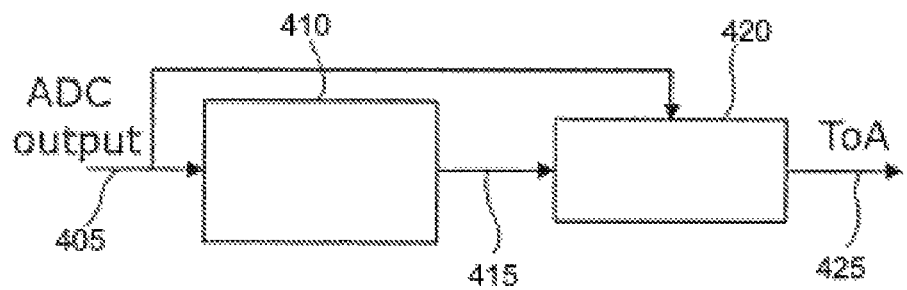
FIG. 4 illustrates a simplified block diagram of an example embodiment of part of a baseband processing module.

FIG. 4 illustrates a simplified block diagram of a part of the baseband range-determining-module 340 arranged to perform ToA measurements on received-data-packets.

A channel estimate generator component 410 is arranged to receive the digital representation of the received RF signal 405 output by the ADC 330 and to generate a channel estimate 415 for a transmission channel between the communication device 300 and a transmitter device from which the received RF signal is being transmitted. A classification module 420 is arranged to receive the channel estimate information 415 generated by the channel estimate generation component 410, and the digital representation of the received RF signal 405, and to determine a ToA measurement 425 for a peak within the received RF signal based at least partly on the channel estimate information 415. For example, a signal received via a multipath channel will comprise a plurality of multipath components, which will show up in the taps of the channel impulse response.

The classification module is configured to determine one or more characteristics of the one or more pulses and classify the receiver as either proximal to or distal from the transmitter based on the one or more characteristics. The characteristics of the pulses relate to the channel characteristics of the channel impulse response. Characteristics that may be used to classify the relative position of a transmitter and receiver are discussed below with regard to FIGS. 5, 6a and 6b.

The classification module 420 may also be arranged to identify a Line-of-Sight (LoS) component of the received signal based on the channel estimate information 415, and to determine a ToA measurement 425 for the LoS component.

It will be appreciated that various mechanisms for performing channel response estimation are known in the art, and a detailed discussion of the implementation of the channel estimation unit is outside of the scope of the present disclosure. In general terms, the channel estimation component 410 may including a symbol correlator arranged to receive the digital representation of the received RF signal 405 output by the ADC 330, and to perform cross-correlation of the received signal 405 with a reference pattern. The correlator may compare the reference pattern to a section of the received signal to determine when a match occurs.

Figure 5:
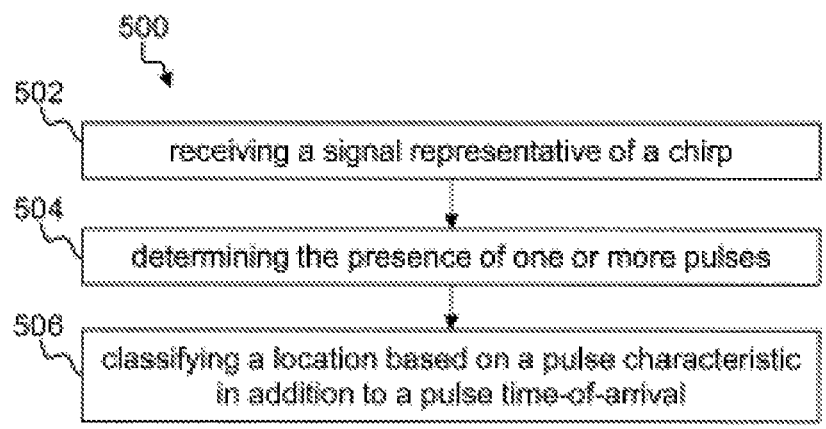
FIG. 5 illustrates an example embodiment of a method for range classification.

FIG. 5 illustrates a method 500 for operating a range-determining-module for a transceiver. In this method, a signal representative of a chirp from a transmitter is received 502 at the receiver. The chirp may be transmitted as a UWB signal. The signal that is received differs from the originally transmitted chirp due to the transfer function of the environment through which the chirp signal travels from the transmitter to the receiver. The received signal is therefore a channel impulse response, which may contain one or more pulses, or peaks in the signal, that relate to the original chirp, depending on the channel characteristics of the environment.

The presence of the one or more pulses in the received signal is determined 504. The determination of the presence of one or more pulses may be achieved by correlating the received signal with a reference signal, as is known in the art.

The receiver is classified 506, or categorized, as either proximal to or distal from the transmitter based on one or more characteristics of the one or more pulses in addition to a time-of-arrival of the one or more pulses. The one or more characteristics of the one or more pulses may be indicative of the channel characteristics for the signal sent from the transmitter to the receiver.

The time-of-arrival of the one or more pulses may be assessed in an initial step and, depending upon the outcome of the initial step, the assessment may be validated by then considering the one or more characteristics. The validation of the ToF measurement using the one or more characteristics may be used if the ToF measurement indicates that there is a moderate or high probability that the receiver is proximal to the transmitter. For example, the validation may be used when the ToF measurement indicates that the receiver is less than 2 or 3 times a threshold distance away from the transmitter. In this way, the combination of ToF measurement combined with the specific channel characteristics in/around a vehicle may be used to decide whether a key is inside or outside of a car (whether the transmitter is proximal to or distal from the receiver).

The time-of-flight (ToF) of the one or more pulses may be a ToF of the first detected pulse (line-of-sight ToF). As discussed below in relation to FIGS. 6a and 6b, the one or more characteristic may include non-time-of-flight characteristics, such as:

(i) a measure of a separation between pulses in at least a portion of the signal;
(ii) a measure of an energy, intensity or amplitude of at least a portion of the signal; or
(iii) the number of pulses in at least a portion of the signal.

Figure 6A:
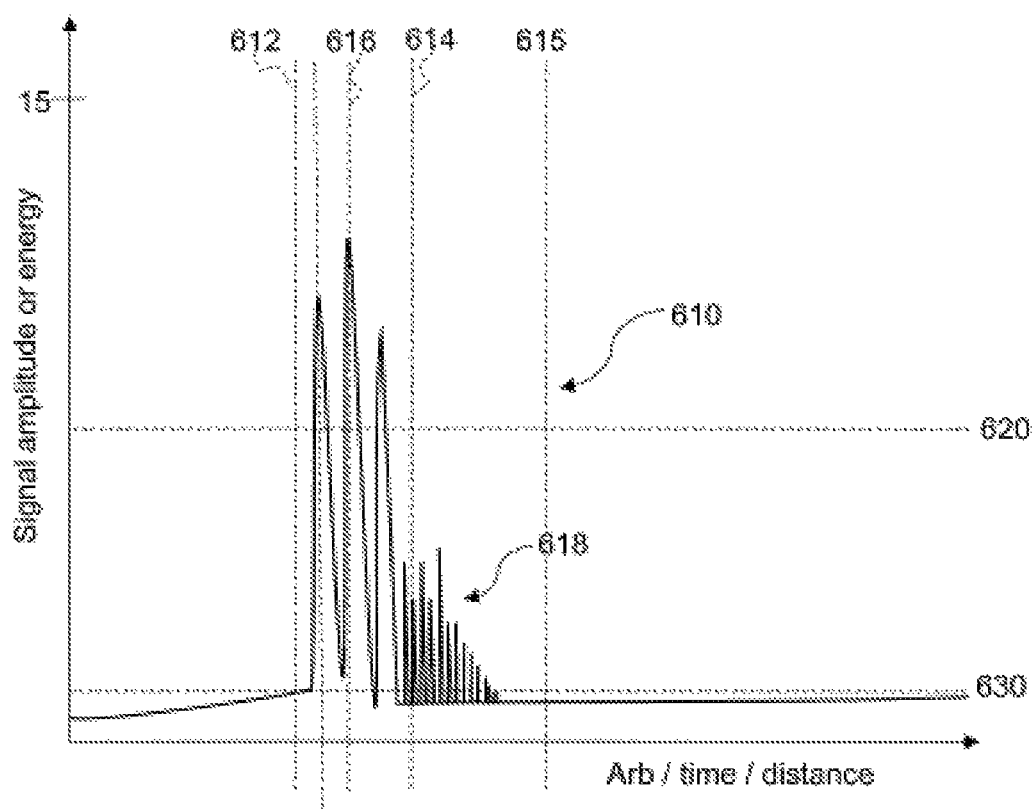
FIG. 6a illustrates an exemplary (artificial) channel impulse response in the case that a receiver is proximal to a transmitter.
Figure 6B:
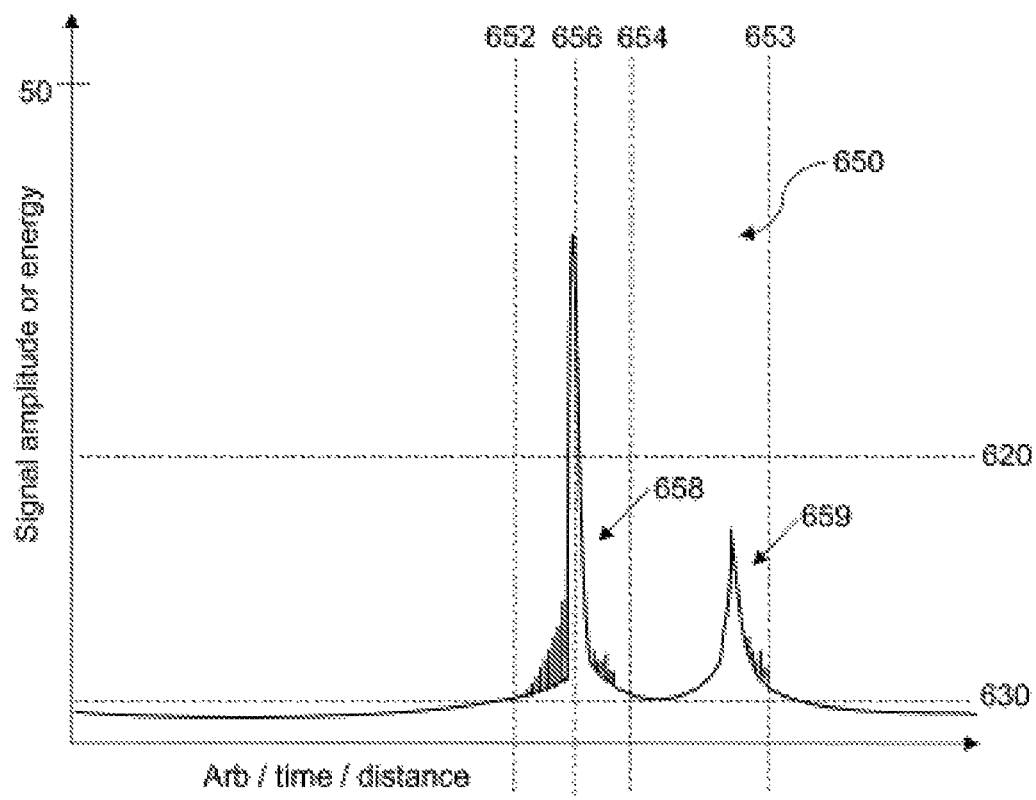
FIG. 6b illustrates an exemplary (artificial) channel impulse response in the case that a receiver is distal from a transmitter.

FIGS. 6a and 6b illustrate exemplar profiles which relate to channelling pulse responses received at a receiver following the transmission of a chirp signal by a transmitter. In general, a received chirp signal differs from that originally transmitted due to the propagation of the signal through the environment between the transmitter and the receiver.

FIG. 6a illustrates an example profile (not actual data) indicative of a channelling pulse responses of an arrangement in which a transmitter and receiver are both provided in a confined space of complex geometry, such as the interior of a car. For example, the transmitter may be provided within a key fob that is situated within a user's pocket between a car seat and the user, and the receiver may be provided in a base station in the vehicle. FIG. 6b illustrates an example profile (not actual data) indicative of a channelling pulse response of an arrangement in which the transmitter and receiver are separated by an expansive open terrain. For example, the transmitter may be situated in a key fob that the user is holding in their hand some distance away from a vehicle, and where the receiver is provided in a base station within or on the vehicle. It can be seen that various characteristics of the exemplary signals differ between the case in which the receiver is proximal to the transmitter (FIG. 6a) and the example in which the receiver is distal from the transmitter (FIG. 6b).

The proximal profile 610 illustrated in FIG. 6a is a higher energy signal than the distal profile 650 illustrated in FIG. 6b (note non-equivalent vertical axis scales in FIGS. 6a and 6b). A variety of methodologies may be used in order to determine the amplitude or energy, or relative amplitude or energy, of a signal. For example, a hamming window may be used in order to select a signal that is considered to be associated with a particular chirp, or portion of such a signal. In FIGS. 6a and 6b, a hamming window is shown between outer markers, 612, 614, 652, 654 that are a particular interval away from the most significant detected peak 616, 656. An integral may be taken between the respective sets of outer markers 612, 614, 652, 654. In this way, the amplitude, intensity or energy of a signal may be integrated as a function of time, distance or arbitrary units. The type of signal may be classified as, for example, representative of the case where the receiver is proximal to or distal from the transmitter based on a comparison between the determined amplitude, intensity or energy and a threshold value.

As discussed below, if the measured quantity is greater than the threshold value then the signal may be categorised as being representative of the case where the transmitter is distal from the receiver. Conversely, when the determined quantity is less than the threshold value it may be determined that the signal is representative of the case that the receiver is proximal to the transmitter. The reliability of the use of amplitude, intensity or energy metrics may be improved by normalising the integrated value by an absolute value of a peak within the signal, such as the maximum height of the peaks within the signal.

The proximity of the receiver and the transmitter may therefore be categorized based on a comparison between a threshold level and the measured energy, intensity or amplitude within an interval. The interval may be five to ten nanoseconds. The threshold level may be set at 80% of the integral of a signal over the interval for the distal case. For an example in which the physical distance of a PKE device is identical or similar in the proximal and distal cases but the key is within the vehicle in the proximal case and outside of the vehicle in the distal case, the integral of the reflections within the interval between the outer markers 612, 614 in FIG. 6a may result in a value of 30; whereas the integral of the signal without substantial reflections between the outer markers 652, 654 in FIG. 6b may result in a value of 60. A threshold value may be set at 48 in this case (80% of the distal value of 60). Given an equal distance between the transmitter and receiver, the transmitted energy tends to be greater in the distal case than the proximal case because energy is lost from the signal for each reflection and there are more reflections in the proximal case due to complex in-vehicle geometry. Therefore, when the energy of the signal is used as a cross-check for whether or not the transmitter is proximal to the receiver (within the vehicle) close to a boundary condition, the loss of signal energy with distance can be ignored and the transmitter may be determined to be distal to the receiver (outside the vehicle) if the energy of pulse received within the interval exceeds the threshold level.

Another characteristic that differs between the proximal profile 610 and the distal profile 650 is the number of peaks within the profile. In the signal as a whole, the proximal profile has a greater number of peaks 618 (8 peaks) with a maximum value greater than a threshold level 620 than the number of peaks 658 (1 peak) of the distal profile 650 compared with the same threshold 620. The difference in the number of peaks can be explained by considering the environment through which the signals are propagated. In a compact environment such as the interior of a vehicle in which the transmitter is proximal to the receiver, a number of services of the vehicle each provide respective signal propagation paths and so result in the generation of multiple peaks within the channelling pulse response. Whereas, where the transmitter is remote from the receiver and separated by substantially free space, as is a typical scenario where a transponder key is outside of the vehicle, then there are few substantial reflections of the chirp which result in peaks 658, 659 in the channelling pulse response.

The proximity of the receiver and the transmitter may therefore be categorized based on a comparison between a threshold number of pulses and the measured number of pulses in an interval that have a magnitude greater than a magnitude threshold. The interval may be ten to twenty nanoseconds (shown between the first outer marker 612 and an extended interval marker 615 in FIG. 6a and between the first outer marker 652 and an extended interval marker 653 in FIG. 6b). The threshold magnitude 620 may be calculated from a standard deviation of a noise level 630 in FIGS. 6a and 6b. For example, the threshold magnitude 620 may be 3 times the noise level. The threshold number of pulses may be 3 pulses. That is, if more than 3 pulses within the interval exceed a threshold magnitude then the receiver may be determined as being proximal to the transmitter (within 30-60 cm, for example).

In addition, the typical spacing between the reflection surfaces relates to the typical spacing seen between reflection peaks in the channelling pulse response. The in-car environment may have multiple reflections with differences between individual paths in the 50 cm range (paths from the roof, the windows, the seats, the doors, etc). In contrast, the channel characteristics for the car outside environment has less paths and the respective length difference is larger in the range of >1 m. For example, the hamming window defined by the outer markets 612, 614 of the proximal profiles 610 comprises a plurality of peaks, whereas the same size window in the distal window only contains a single significant peak 658.

The proximity of the receiver and the transmitter may therefore be categorized based on a comparison between a threshold pulse spacing and the measured pulse spacing. The threshold pulse spacing may correspond to a distance of 30 cm to 60 cm, for example. That is, if the measured pulse spacing corresponds to a distance of less than 60 cm then the receiver is determined as being proximal to the transmitter (within 60 cm).

As would be expected, the earliest significant peak is received at an earlier time 617 for the proximal profile 610 than the corresponding time 656 for the earliest peak 658 in the distal profile 650. A time of flight, or distance determined from the instant time, or bin number, of the earliest peak therefore provides an indicator of the distance between the receiver and the transmitter. The determined distance may be compared with a threshold distance in order to determine whether the receiver is proximal to or distal from the transmitter. The quantity compared with the distance may have units of time, distance or be unit less.

A vehicle passive keyless entry system may be provided with a range-classifying-module that implements one or more of the above methods that use a characteristic of a receiver signal in addition to the time of flight information. In some example, such a system may enable sufficiently accurate determination of the relative position of the transmitter and receiver using only a single node, or anchor, to receive the signal representative of a chirp. Such a system may therefore be of reduced complexity compared to implementations that require multiple anchors.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or micro controllers), or other control or computing devices. A processor can refer to a single component or to plural components.

In other example, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile desktop, processor, look-up table, microcontroller, consumer, equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A range-classifying-module for a radio receiver, the range-classifying-module configured to:
   receive a signal representative of a chirp from a transmitter;
   determine the presence of one or more pulses in the received signal; and
   classify the receiver as either proximal to or distal from the transmitter based on one or more characteristics of the one or more pulses in addition to a time-of-arrival of the one or more pulses.

2. The range-classifying-module of claim 1, wherein the one or more characteristics of the one or more pulses are dependent on a channel characteristic of a channel between the transmitter and the receiver.

3. The range-classifying-module of claim 1, wherein the one or more characteristics of the one or more pulses are independent of a time-of-arrival of the one or more pulses.

4. The range-classifying-module of claim 1, wherein the receiver is classified as either proximal to or distal from the transmitter based on the one or more characteristics being indicative of the transmitter being either inside or outside of a vehicle.

5. The range-classifying-module of claim 1, wherein the one or more characteristics comprise a separation between pulses in at least a portion of the signal.

6. The range-classifying-module of claim 1, wherein the one or more characteristics comprise an energy, intensity or amplitude of at least a portion of the signal.

7. The range-classifying-module of claim 1, wherein the one or more characteristics comprise the number of pulses in at least a portion of the signal.

8. The range-classifying-module of claim 1, wherein the one or more characteristics comprise one or more non-time-of-flight characteristics of the one or more pulses.

9. The range-classifying-module of claim 1, wherein the one or more characteristics comprise a single characteristic of a plurality of pulses.

10. The range-classifying-module of claim 1, configured to make a separate decision for each of the one or more characteristics and the time-of-arrival measurement and to the classify the receiver as either proximal to or distal from the transmitter based on the separate decisions.

11. The range-classifying-module of claim 1, wherein the time-of-arrival is based on a time-of-arrival of the first-received significant pulse of the one or more pulses.

12. The range-classifying-module of claim 1, wherein the chirp is an ultra-wide band, UWB, pulse.

13. A vehicle passive keyless entry system comprising a radio receiver having the range-classifying-module of claim 1.

14. The vehicle passive keyless entry system of claim 13, wherein the vehicle passive keyless entry system comprises only a single radio receiver for receive the signal representative of a chirp.

15. A method for range classification comprising:
receiving, at a receiver, a signal representative of a chirp from a transmitter;
determining the presence of one or more pulses in the received signal; and
classifying the receiver as either proximal to or distal from the transmitter based on one or more characteristics of the one or more pulses in addition to a time-of-arrival of the one or more pulses.

* * * * *